Figure 2:
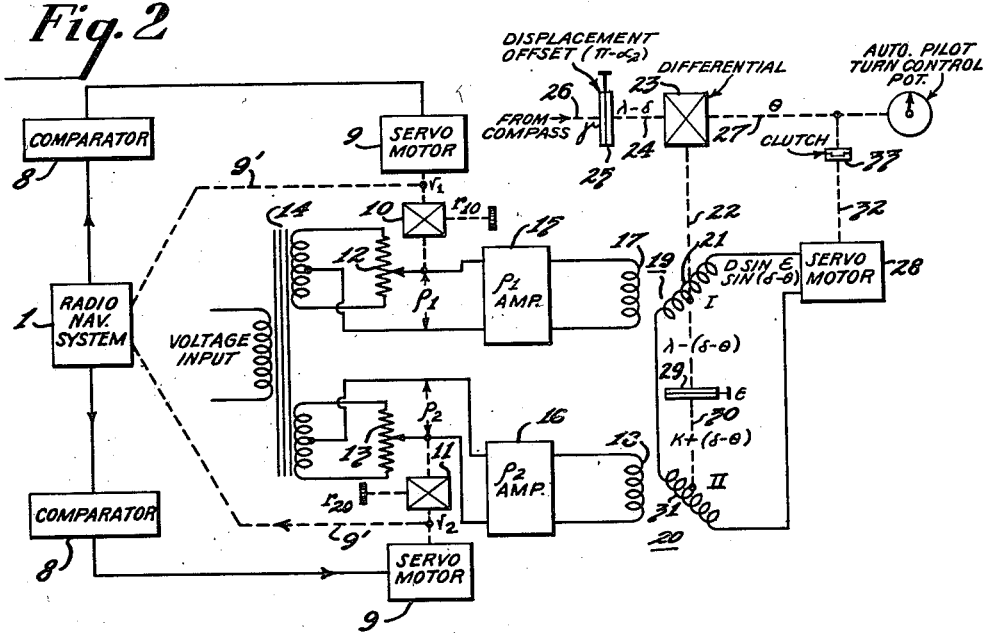

June 4, 1957   W. K. ERGEN ET AL   2,794,594
HEADING COMPUTER FOR RADIO NAVIGATION SYSTEMS
Filed Sept. 22, 1948   2 Sheets-Sheet 1

INVENTORS.
William K. Ergen,
Albert H. Palya &
Alfred W. Frick

BY

ATTORNEY.

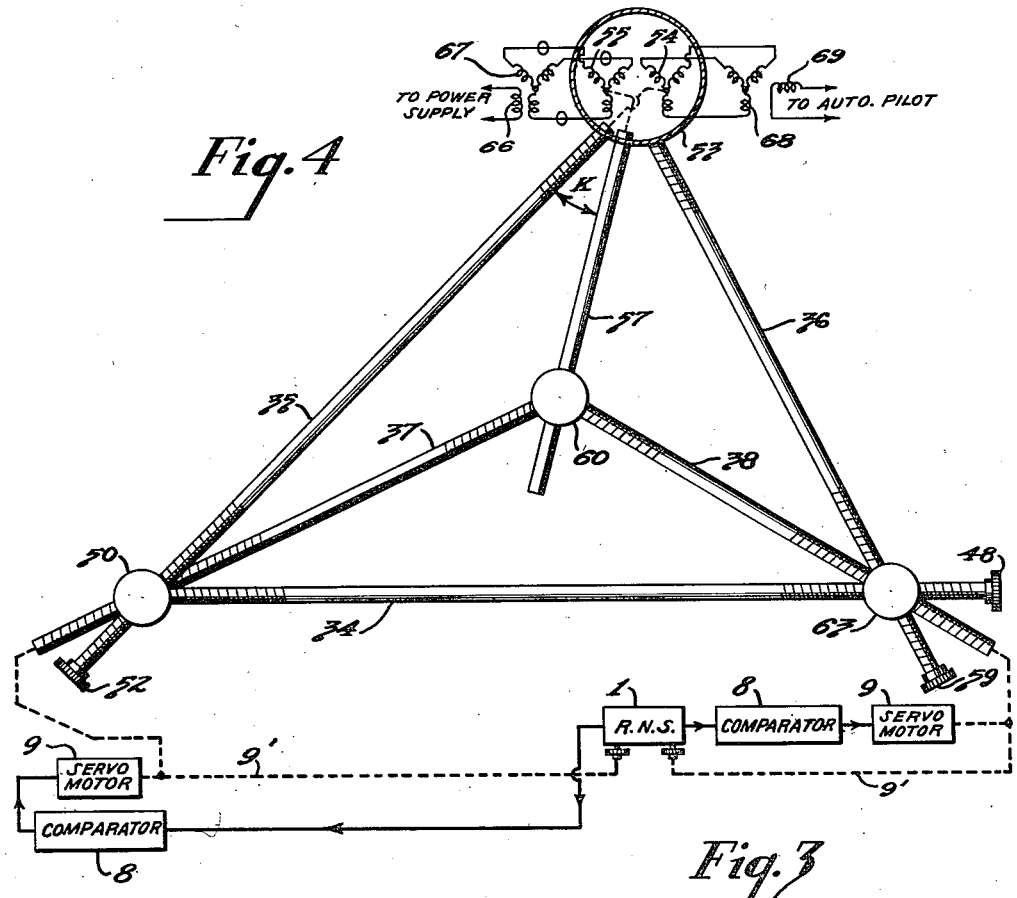

United States Patent Office 2,794,594
Patented June 4, 1957

2,794,594

HEADING COMPUTER FOR RADIO NAVIGATION SYSTEMS

William K. Ergen, Oak Ridge, Tenn., and Albert H. Palya, Haddon Heights, and Alfred W. Frick, Camden, N. J., assignors, by mesne assignments, to the United States of America as represented by the Secretary of the Air Force Application September 22, 1948, Serial No. 50,634

2 Claims. (Cl. 235—61)

This invention relates to navigation systems wherein radio pulses intermittently transmitted from a moving vehicle are repeated or reflected from ground stations to the vehicle where they are utilized to determine the instantaneous position of the vehicle with respect to such stations. More particularly, the invention provides an improved heading computer which is located on the vehicle and functions with other parts of the navigation system automatically to guide the vehicle to a predetermined destination.

With the exception of the improved heading computer, the radio navigation system herein described is disclosed by a copending application of Russo and Collar, Serial No. 765,158, filed July 31, 1947. This copending application is directed more particularly to the problem of effecting automatically certain steps previously performed manually in the operation of the radio navigation system disclosed and claimed in a copending application of Seeley, Serial No. 638,387, filed December 29, 1945, now Patent No. 2,526,287.

The principal object of the present invention is to provide an improved heading computer and method of operation whereby data showing the instantaneous position of a vehicle with respect to two fixed points is utilized to guide the vehicle to a predetermined point. From this positional information, the direction of the point of destination from the vehicle is computed. The computed direction of the vehicle is compared with the heading of the vehicle, this heading being determined by a compass. Any difference between the computed direction and the measured heading is fed to the automatic pilot of the vehicle. The automatic pilot tends always to make the heading coincide with the computed direction.

The invention will be better understood from the following description considered in connection with the accompanying drawings and its scope is indicated by the appended claims.

Figure 1:
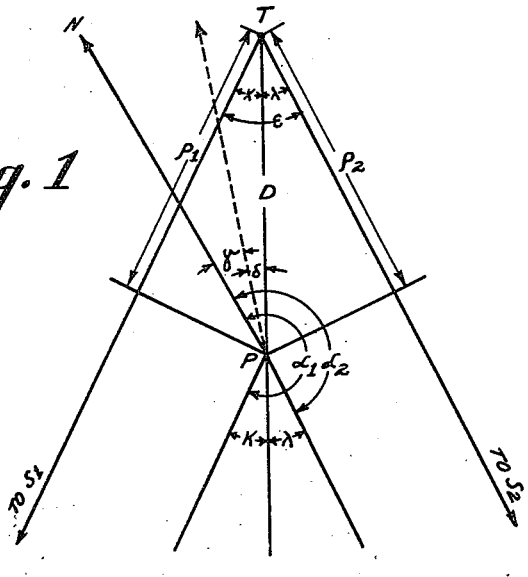

Referring to the drawings:

Figure 1 is an explanatory diagram relating to the operation of the improved heading computer, Figure 2 illustrates an electrical form of the improved heading computer, Figure 3 is a schematic diagram of a part of a radio navigation system such as is described in the aforementioned copending applications, and Figures 4 and 5 illustrate a mechanical form of the improved heading computer.

In the electrical form of the improved heading computer, the computation of the direction of the point of destination is based on an approximation which becomes increasingly better the closer the vehicle approaches such point. It has been found that this approximation guides the vehicle toward the desired point from any point within a large area.

Referring to Figure 1, T indicates the point of destination. P is the moving vehicle. The base stations $S_1$ and $S_2$ are assumed to be at a distance from P which is large compared with the distances in the figure, and $S_1$ and $S_2$, therefore, do not appear in the drawing. The distance $S_1T$ may be designated by $r_{10}$ and the distance $S_2T$ by $r_{20}$. The distance $S_1P$ is designated $r_1$ and the distance $S_2P$ is designated $r_2$.

The distances $$\rho_1 = r_{10} - r_1$$
$$\rho_2 = r_{20} - r_2$$

appear in Fig. 1. The distance from the vehicle to the target is designated D. The angle $S_1TS_2$ is designated by $\epsilon$. The angle $S_1TP$ is designated by $\kappa$, and $S_2TP$ is designated by $\lambda$.

Evidently, $D = \rho_1/\cos \kappa = \rho_2/\cos \lambda$, provided that the conditions $r_{10} \gg \rho_1$ and $r_{20} \gg \rho_2$ are fulfilled. These conditions are the basis for the approximation previously mentioned.

The angle $\alpha_1$ between north and the direction $TS_1$ and the angle $\alpha_2$ between north and the direction $TS_2$ are assumed to be known from previous reconnaissance. The angle $\gamma$ is the angle between the heading of the vehicle and north. It is indicated by the compass. The angle $\delta$ is the angle between the desired heading PT and the actual heading of the vehicle. The heading computer functions to make $\delta = 0$.

The apparatus of Figure 2 includes a radio navigation system 1 which is shown in the form of a box and is like that disclosed by the aforementioned Seeley application. As indicated by Figure 3, this radio navigation system includes an oscillator 2 which supplies its output through a pulse generator 3 to a cathode ray tube indicator 4 with circular sweep for producing a marker pip M on the fluorescent screen of such tube. Output from the oscillator 2 is also supplied through a calibrated phase shifter 5 and a pulse generator 6 to a transmitter 7 from which a series of extremely short pulses of radio frequency are transmitted to the ground station $S_1$. These transmitted pulses cause the ground station $S_1$ to transmit pulses of different radio frequency which are received by receiver 7a and function to produce on the fluorescent screen a pip A.

The phase shifter 5 is adjusted to advance the phase of the pulses transmitted to the station $S_1$ so that the pip A coincides with the pip M and the distance between the vehicle and the station $S_1$ may be read from the scale of the phase shifter.

A second circuit (not shown) like that of Figure 3 is operated to generate pulses the timing of which can be advanced by a second calibrated phase shifter, to transmit these pulses to the ground station $S_2$ causing the station $S_2$ to transmit pulses of different radio frequency, to receive these latter pulses and make them generate a pip B on the tube 4. By adjusting this second phase shifter, the pip B is made to coincide with the marker pip M so that the distance of the vehicle from the station $S_2$ may be read from the scale of this second phase shifter.

In accordance with the aforementioned Russo and Collar application, separate circuits (functioning alternately in connection with the ground stations $S_1$ and $S_2$, respectively) are each provided with a feedback loop including a comparator 8, a servomotor 9 and a shaft 9' driven from the servomotor 9 for constantly adjusting the phase shifters of the system 1. Each comparator gives zero voltage if the marker pulse M and the corresponding returning pulse A or B coincide. If there is no such coincidence, a voltage is obtained from the comparator, and the polarity of this voltage depends on whether the returning pulse precedes the marker pulse or follows it.

The comparator voltage is fed to the servomotor, if necessary, after suitable amplification, and the servomotor turns the phase shifters of system 1 in a direction depending upon the polarity of the above mentioned voltage. The arrangement is such that the servomotor brings the marker pulse and the returning pulse into coincidence. Then the positions of the phase shifters and the servomotor shafts 9' are the true measurers of the distances $r_1$ and $r_2$, respectively. The data thus derived with respect to the position of the vehicle is utilized by the heading computer of the present invention to direct the vehicle to its predetermined destination.

Referring to Figure 2, the already known value $r_{10}$ is fed to a differential 10. To another leg of the differential is fed the distance $r_1$, which is obtained, in the preferred embodiment shown in the figure, from one of the servomotor shafts 9', as just described. The result is $\rho_1 = r_{10} - r_1$.

By an exactly similar arrangement consisting of differential 11, the system 1, a second comparator 8, a second servomotor 9 and a servomotor shaft 9', we obtain $\rho_2$ as the output of differential 11. The output shafts of differentials 10 and 11 position sliders on potentiometers 12 and 13, respectively. The end points of these potentiometers are connected to center tapped secondaries of the transformer 14, and the voltages between the sliders and the center taps are thus proportional to $\rho_1$ and $\rho_2$, respectively.

The voltages $\rho_1$ and $\rho_2$ are fed to isolating amplifiers 15 and 16, respectively. The outputs of those amplifiers feed into the primaries 17 and 18 of angle resolvers 19 and 20. The purpose of the amplifiers 15 and 16 is to prevent loading of the potentiometers 12 and 13 by the relatively low impedances of primaries 17 and 18. The secondary coil 21 of angle resolver 19 is positioned by shaft 22. This shaft in turn is positioned through differential 23, shaft 24, clutch 25, and shaft 26, by the compass.

The compass positions the shaft 26 according to the heading $\gamma$. The clutch 25 is used to introduce between shafts 26 and 24 an offset equal to the pre-known value $\pi - \alpha_2$. The result is the positioning of shaft 24 according to $\lambda - \delta$ which may be seen from the following explanation: If, in Figure 1, the line between the angles $\lambda$ and $\alpha_2$ is extended through point P, then the angle $\lambda$ is also defined by the angle between the extended line and the line joining points P and T. The angle $\pi - \alpha_2$ equals the angle made by the extended line and true north. If this latter angle is added to the angle $\gamma$ as is done by the clutch 25, then the shaft 24 is positioned at an angle which is the sum of the two or $\lambda - \delta$.

An angle $\theta$ is introduced into differential 23 through shaft 27, by servomotor 28. Consequently shaft 22 and secondary 21 are positioned according to $\lambda - (\delta - \theta)$. The angle $\epsilon$ of preknown value is introduced in clutch 29. Consequently, shaft 30 and secondary coil 31 of angle resolver 20 are positioned according to $\kappa + (\delta - \theta)$, as can be verified by reference to Fig. 1.

The secondaries 21 and 31 are connected in series, and they generate together a voltage proportional to $$\rho_1 \cos [\lambda - (\delta - \theta)] - \rho_2 \cos [\kappa + (\delta - \theta)] =$$
$$D \{\cos \kappa \cos [\lambda - (\delta - \theta)] - \cos \lambda \cos [\kappa + (\delta - \theta)]\} =$$
$$D \sin \epsilon \sin (\delta - \theta)$$

This voltage is fed to the servomotor 28, which drives shaft 32 and, through clutch 33, the servomotor drives shaft 27. The servomotor tends to make the voltage at its input equal to zero, and consequently it sets up the angle $\theta = \delta$ on shaft 27.

If the vehicle deviates from its desired heading PT, the angle $\theta$, which is also fed into the auto pilot, causes a turn of the vehicle in such direction that the deviation of the heading from the direction PT is reduced. In this way the vehicle is brought into the desired heading.

The clutch 33 merely serves the purpose of protecting the mechanism in case the deviation $\delta$ is so great as to call for an excessively large turn of the vehicle. In that case, the automatic pilot just hits its stops and clutch 33 slips.

From the above, it may be seen that the servomotor 28 tends to make $\theta = \delta$. The automatic steering mechanism then will guide the vehicle in a turn which is the sharper, the larger $\delta$. The mechanism described is adapted to automatic steering devices which are controlled by mechanical shaft rotation such as the E-4 Sperry auto pilot (commercially known by the designation A-12).

If an automatic steering control is available which readily responds to voltages of the type obtained from the secondaries 21 and 31, the mechanism can be considerably simplified. Differential 23, shaft 27, clutch 33, shaft 32 and servomotor 28 can be omitted. Shaft 24 directly feeds into shaft 22 and positions secondary 21 directly and secondary 31 through the clutch 29. It can readily be shown that the output voltage of the series connection of 21 and 31 becomes, under these conditions, equal to $D \sin \epsilon \sin \delta$. This voltage could be directly fed into the steering mechanism and would cause a left or right turn, depending upon the sign of $\delta$.

Positional data, derived as explained above, may be utilized by the mechanical heading computer of Figures 4 and 5 to guide the vehicle to its predetermined destination.

This mechanical heading computer includes five screws 34 to 38 into which are set the distances $2K$, $r_{10}$, $r_{20}$, $r_1$ and $r_2$, $2K$ being the distance $S_1$, $S_2$. In this way is provided a scale model showing the relative positions of the stations $S_1$ and $S_2$, the point of destination, and the vehicle, and the angle $\kappa$ (see Figure 1) as defined.

Each of the screws 34 to 38 is threaded through a nut at one of its support points and is provided at its other support point with a bearing. Thus the screw 34 is threaded through a nut 40 which is fixed to a shaft 41 and provides a bearing for a shaft 42 fixed to a nut 43. At its other end, the screw 34 has a bearing 44 which is fixed to a shaft 45 and provides a bearing for a shaft 46 to which is fixed a nut 47. The screw 34 can be turned manually by means of a knob 48 to separate the nut 40 and the bearing 44 by a distance proportional to $2K$.

Screw 35 is supported by a bearing 49 and a nut 50 provided at its lower side with a shaft which rides in the nut 47. By turning a knob 52, the distance between the bearing 49 and the nut 50 is made proportional to the distance $r_{10}$.

The screw 36 is threaded through the nut 43, is supported at its end by a bearing 58 and is turned by a knob 59 to separated the bearing 58 and the nut 43 by a distance proportional to $r_{20}$.

The screws 37 and 38 are supported at one of their ends by bearings 60 and 61 and the other of their ends by nuts 47 and 63. The bearings 60 and 61 are independently rotatable.

A radio navigation system, two comparators, two servomotors and two servomotor shafts analogous to 1, 8, 9 and 9' of Figure 2, are used to drive screws 37 and 38 so that the distance between the nut 47 and the bearing 61 is proportional to $r_1$ and that between the bearing 60 and the nut 63 is proportional to $r_2$. Under these conditions, the position of the bearings 60 and 61 corresponds to the instantaneous position of the vehicle. Bearings 60 and 61 are supported on a collar 64 which is fixed to a shaft 65 and is arranged to slide along rod 57. The other end of rod 57 is fixed to a collar 56 which, in turn, is rigidly connected to a shaft 55'. The shaft 55' turns freely in the bearings 58 and 49. Shaft 55' turns the rotor 55 of a synchro differential. The stator 53 of the differential, and its stator winding 54, are rigidly connected to bearing 49.

In this way, the angle $\kappa$ between the line from the station $S_1$ to the point T and the line from the vehicle to the point T is set into the synchro differential. The compass bearing $\alpha_1$ of the line from the station $S_1$ to the point T is known from previous reconnaissance, and it is fed into a synchro transmitter as angular displacement of its rotor 66 relative to its stator 67. The compass heading controls the angular displacement of rotor 69 with respect to stator 68 of another synchro. It is well known to those skilled in the art that the arrangement can be made in such a way that rotor 69 yields no output voltage if the vehicle is headed towards T, but that the rotor 69 yields a voltage of one phase or the other if the vehicle heads to the left or right of T. By connecting this output voltage to the autopilot circuit, the vehicle is guided automatically to the point T.

What the invention provides is a heading computer which may assume either an electrical or a mechanical form and functions automatically to guide a vehicle to a predetermined destination point in response to data dependent on (1) the distance of the vehicle from two base stations, (2) the distance of the predetermined destination point from the base stations, and (3) the distance between the base stations or the angle which is formed by the lines from the base stations to the destination point. These data are used to compute the heading which the vehicle should have in order to reach the destination point and the computed heading is compared with the actual heading as measured by the compass. Any difference between the computed and actual headings is utilized to energize the autopilot in such a way that the actual heading is made to coincide with the computed heading.

What is claimed is:

1. In a computer for guiding a vehicle to the first of three fixed points in response to information based on the position of said vehicle with respect to the second and third of said points, the combination of means for producing a first potential proportional in value to the distance between said vehicle and the first of said points as projected on a line through the first and second of said points, means for producing a second potential proportional to said distance as projected on a line through the first and third of said points, a compass, a first member driven by said compass a second member driven by and offset from said first member by 180° minus the angle between north and the line from said first point to said third point, a pair of angle resolvers each having a stator and a rotor winding each having its stator winding energized in response to a different one of said potentials and having its rotor winding offset from the rotor winding of the other by the angle between said lines, means responsive to movement of said second member for positioning the rotor windings of said angle resolvers, and means responsive to the output of said rotor windings for producing an effect dependent on the angle between the heading of said vehicle and the distance from said vehicle to said first point.

2. In a computer for guiding a vehicle to the first of three fixed points in response to information based on the position of said vehicle with respect to the second and third of said points, the combination of means for producing a first potential proportional in value to the distance between said vehicle and the first of said points as projected on a line through the first and second of said points, means for producing a second potential proportional to said distance as projected on a line through the first and third of said points, a compass, a first member driven by said compass, a second member driven by and offset from said first member by 180° minus the angle between north and the line from said first point to said third point, a pair of angle resolvers each having a stator and a rotor winding, each having its stator winding energized in response to a different one of said potentials and having its rotor winding offset from the rotor winding of the other by the angle between said lines, a servomotor having the output from said rotor windings differentially combined and applied to said servomotor input, a third member driven by said servomotor, a fourth member, means to drive said fourth member in response to said second and third members, and means to position the rotor windings of said angle resolvers responsive to the movement of said fourth member whereby said third member is displaced proportionally to the angle between the heading of said vehicle and the distance from said vehicle to said first point.

References Cited in the file of this patent

UNITED STATES PATENTS

| | | |
|---|---|---|
| 2,438,112 | Darlington | Mar. 25, 1948 |
| 2,472,129 | Streeter | June 7, 1949 |
| 2,519,180 | Ergen | Aug. 15, 1950 |
| 2,569,328 | Omberg | Sept. 25, 1951 |